United States Patent [19]
Tassie

[11] 3,763,739
[45] Oct. 9, 1973

[54] HIGH RATE OF FLOW PORT FOR SPOOL VALVES

[75] Inventor: Douglas Pray Tassie, St. George, Vt.
[73] Assignee: General Electric Company, Burlington, Vt.
[22] Filed: June 1, 1971
[21] Appl. No.: 148,833

[52] U.S. Cl............................ 89/7, 89/1 R, 137/625.3
[51] Int. Cl................................................. F41f 1/04
[58] Field of Search ................... 89/7, 8; 137/625.3

[56] References Cited
UNITED STATES PATENTS

| | | | |
|---|---|---|---|
| 2,483,719 | 10/1949 | Anderson | 137/625.3 X |
| 3,207,270 | 9/1965 | Ellis, Jr. | 137/625.3 X |
| 3,011,451 | 12/1961 | Griffin | 89/7 X |
| 3,138,990 | 6/1964 | Jukes et al. | 89/7 |
| 2,981,153 | 4/1961 | Wilson, Jr. et al. | 89/7 |
| 3,046,737 | 7/1962 | Ottestad | 89/7 |
| 3,455,202 | 7/1969 | Dilon et al. | 89/7 |

Primary Examiner—Samuel W. Engle
Attorney—Bailin L. Kuch, Irving M. Freedman, Harry C. Burgess, Frank L. Neuhauser, Oscar B. Waddell and Joseph B. Forman

[57] ABSTRACT

A feature of this invention is a spool valve which has a spool with an O-ring seal, said seal having a given longitudinal dimension, the spool operating in a bore in a housing to open and close a port opening into said bore, said port formed of a plurality of apertures, each aperture having a diameter, parallel to the longitudinal axis of said O-ring, which is smaller than said given longitudinal dimension of said seal.

2 Claims, 5 Drawing Figures

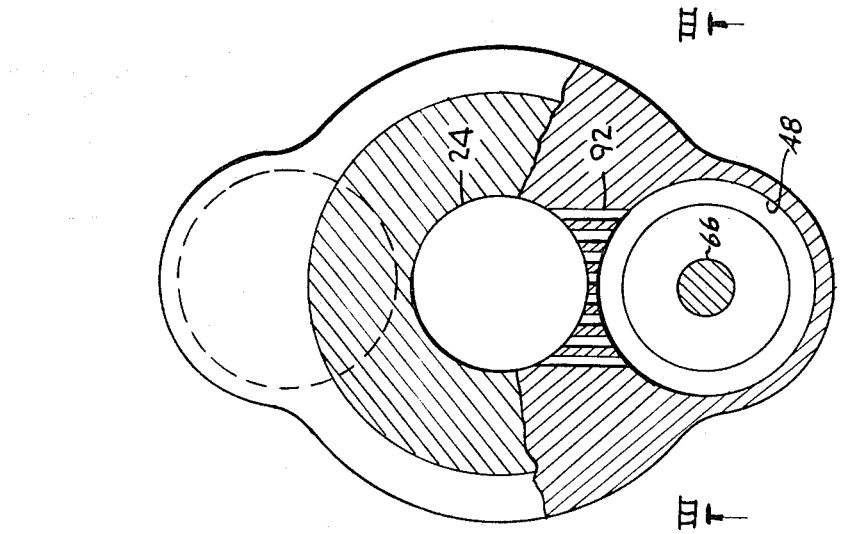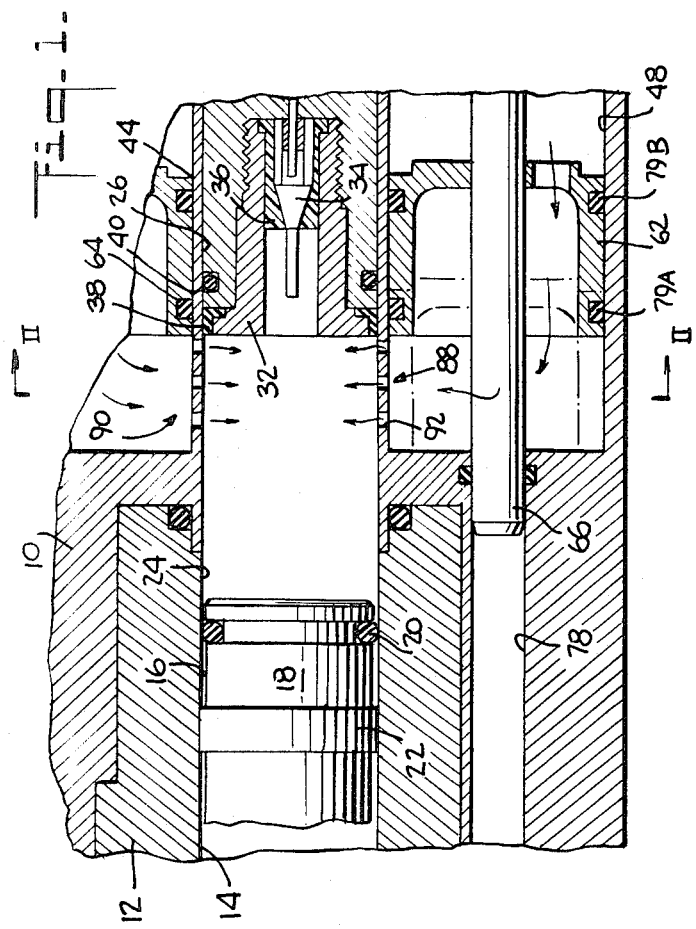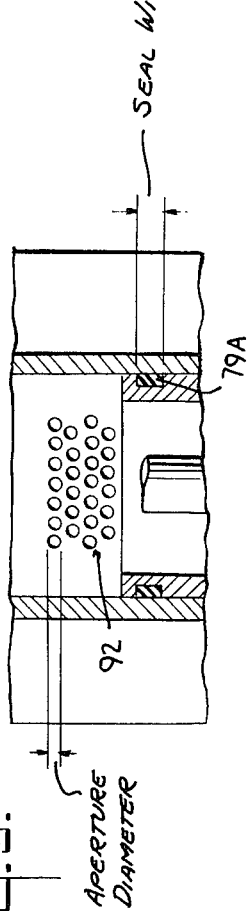

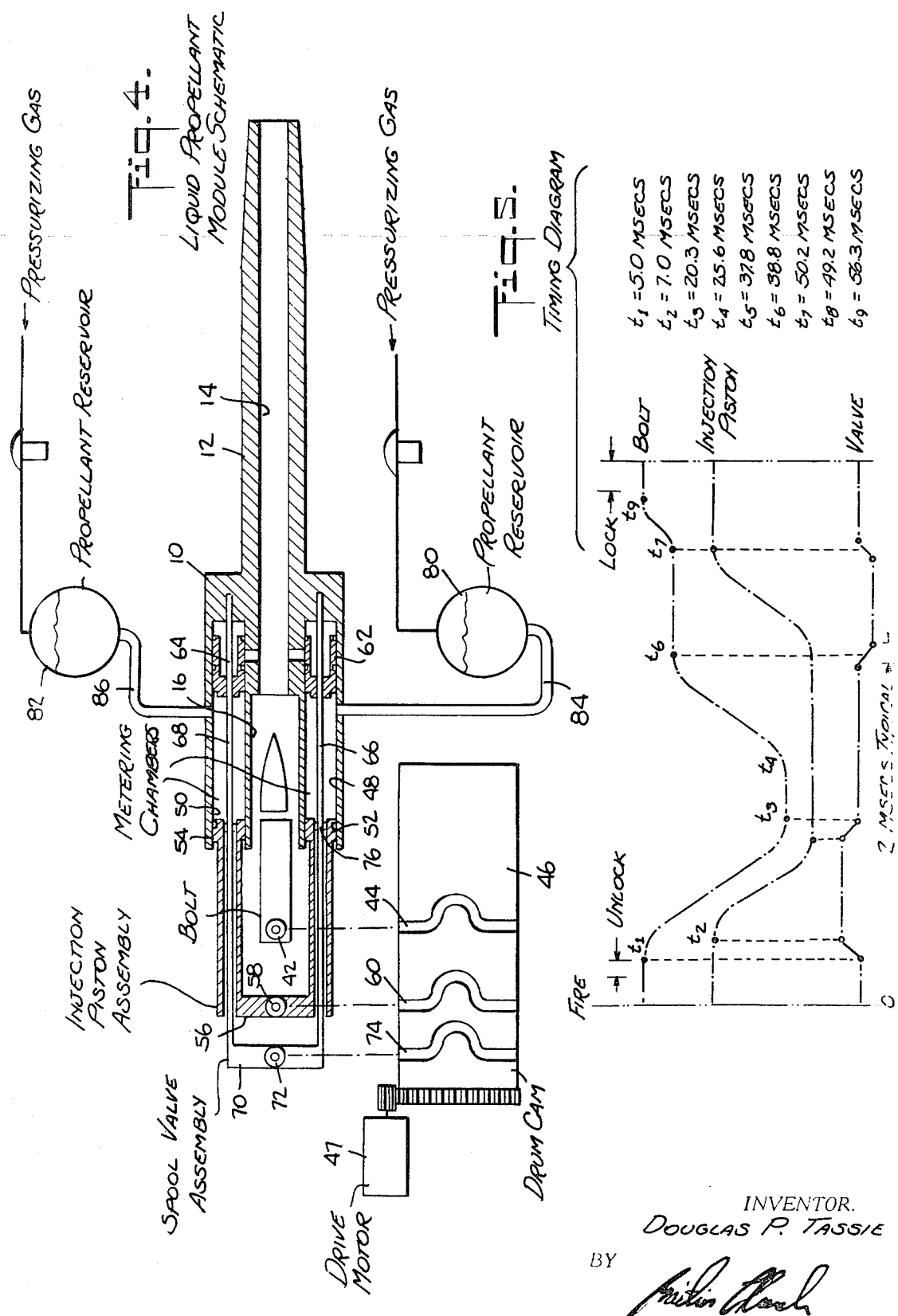

3,763,739

HIGH RATE OF FLOW PORT FOR SPOOL VALVES

BACKGROUND OF THE INVENTION

1. Field of the Invention

This invention relates to high rate of flow, rapid actuation valves, such as spool valves, and is particularly adapted for high rate of fire, liquid propellant guns. The invention herein described was made in the course of or under a contract or subcontract thereunder with the Department of the Navy.

2. Prior Art

Low rate of fire, liquid propellant or initiant guns are disclosed in U.S. Pat. No. 3,455,202 issued July 15, 1969 to Dixon et al., utilizing a quasi-spool valve; and U.S. Pat. No. 3,537,352 issued Nov. 3, 1970 to R. W. Joyce, utilizing a ball valve.

SUMMARY OF THE INVENTION

To achieve a high rate of fire in a liquid propellant gun, the propellant must be injected into the combustion chamber in a short interval of time. This requires high rate of flow of the propellant through the valve controlling the combustion chamber, and a rapid on/off actuation of the valve. A high rate of flow, at a given pressure, requires a large cross-section of conduit. Spool valves are conventionally utilized to provide rapid actuation. An efficient form of the conventional spool valve utilizes O-ring seals. O-ring seals are rapidly damaged when they are passed over an opening which is larger than the longitudinal dimension, i.e., width, of the seal.

Accordingly, it is an object of this invention to provide a spool valve with a port which provides adequate support for the seal while permitting a high rate of flow.

An additional object of this invention is to provide a spool valve with a port which controls the rise and fall characteristics of the pulse envelope of the fluid flow.

A feature of this invention is a spool valve having a spool with an O-ring seal, said seal having a given longitudinal dimension, the spool operating in a bore in a housing to open and close a port opening into said bore, said port formed of a plurality of apertures, each aperture having a diameter, parallel to the longitudinal axis of said O-ring, which is smaller than said given longitudinal dimension of said seal.

BRIEF DESCRIPTION OF THE DRAWING

These and other objects, advantages and features of the invention will be apparent from the following specification thereof taken in conjunction with the accompanying drawings in which:

FIG. 1 is a partial view, in cross-section, taken on a longitudinal plane, through a liquid propellant gun incorporating a spool valve embodying this invention;

FIG. 2 is a transverse view, in partial cross-section, taken along the plane II—II of FIG. 1;

FIG. 3 is a detail view, in cross-section, taken along the plane III—III of FIG. 2;

FIG. 4 is a schematic of the gun of FIG. 1; and

FIG. 5 is a timing diagram of the operation of the gun of FIG. 4.

DESCRIPTION OF THE PREFERRED EMBODIMENT

The gun includes a receiver 10, in which is fixed a barrel 12 having a bore 14. The aft end of the bore is chambered at 16 to receive a projectile 18 having an O-ring seal 20 and a rifling band 22, and to provide a combustion chamber 24. The receiver includes a bolt body 30 having a bolt head 32 having a central bore in which an electrode 34 is fixed in a dielectric sleeve 36. An L-seal 38 is provided at the extreme forward end as a high pressure firing seal, and an O-ring 40 is provided aft of the L-seal as a low-pressure back up seal against fluid leakage during propellant injection. The bolt has a transversely projecting roller 42 which rides in a cam slot 44 in a cam 46, driven by a motor 47.

The receiver includes two additional longitudinal bores 48 and 50 in which two pistons 52 and 54 respectively slide. The two pistons are coupled aft by a yoke 56 which has a transversely projecting roller 58 which rides in a cam slot 60 in the cam 46.

Two spools 62 and 64 respectively slide in the forward portions of the bores 48 and 50. The spools are respectively fixed to rods 66 and 68 which are coupled aft by a yoke 70 which has a transversely projecting roller 72 which rides in a cam slot 74 in the cam 46. Each rod is journalled through a bore 76 in the piston and a bore 78 in the receiver. Each spool has a forward O-ring seal 79A and an aft O-ring seal 79B.

Two propellant reservoirs 80, 82 are pressurized by suitable supplies of gas and are respectively coupled by conduits 84, 86 to the bores 48, 50.

Two ports 88, 90 are povided respectively between the bore 48 and the combustion chamber 24 and the bore 50 and the combustion chamber. Each port consists of a plurality of bores 92, each bore having a diameter which is smaller than the longitudinal width of the O-ring seal 79A, 79B. Thus the annulus around each bore supports the seal as the seal moves over the bore. The total cross-sectional area of each port 88, 90 is equal to the sum of the cross-sectional areas of the component bores 92. The pattern of holes may be arranged to provide either a steep or shallow a rise and fall of the fluid pulse envelope as is desired. For example, if it is desired to have as steep a rise as possible, the number of bores in the first rows of bores which are uncovered by the spool is made as large as possible, but if it is desired to have a shallow fall, the number of bores in the last rows of bores which are covered by the spool is progressively made smaller.

The timing of the gun is illustrated in FIG. 5.

It is contemplated that the inventive concepts hereinabove described may be variously otherwise embodied and combined without departing from the inventive principles involved and intended to be covered by the appended claims, except insofar as limited by the prior art.

What is claimed is:

1. A gun comprising:
   a conduit for passing a fluid;
   a valve coupled to said conduit for controlling the passage of the fluid therethrough;
   said valve including:
   a valve chamber having a surface having a port means for fluid therein,
   a valve spool having a ring type seal abutting said surface for closing and for exposing said port means, said valve spool disposed for movement along an axis,
   said ring type seal having a cross-section diameter parallel to said axis,
   said port means comprising a plurality of apertures, each having a respective diameter parallel to said axis which is smaller than said cross-section diameter of said ring type seal, said plurality of apertures being arranged in a pattern of acceleration of cross-sectional port area such that as said valve spool moves at a constant velocity to open said port, an increasing cross-sectional port area is exposed per unit time.

2. A gun comprising:

a conduit for passing a fluid;

a valve coupled to said conduit for controlling the passage of the fluid therethrough;

said valve including:

a valve chamber having a surface having a port means for fluid therein, a valve spool having a ring type seal abuting said surface for closing and for exposing said port means, said valve spool disposed for movement along an axis, said ring type seal having a cross-section diameter parallel to said axis, said port means comprising a plurality of apertures, each having a respective diameter parallel to said axis which is smaller than said cross-section diameter of said ring type seal, said plurality of apertures being arranged in a pattern of deceleration of cross-sectional port area such that as said valve spool moves at a constant velocity to close said port, a decreasing cross-sectional port area is closed per unit time.

* * * * *